Aug. 9, 1966   H. DRAZDIK ETAL   3,264,792
SUSPENSION CEILING
Filed Dec. 21, 1964
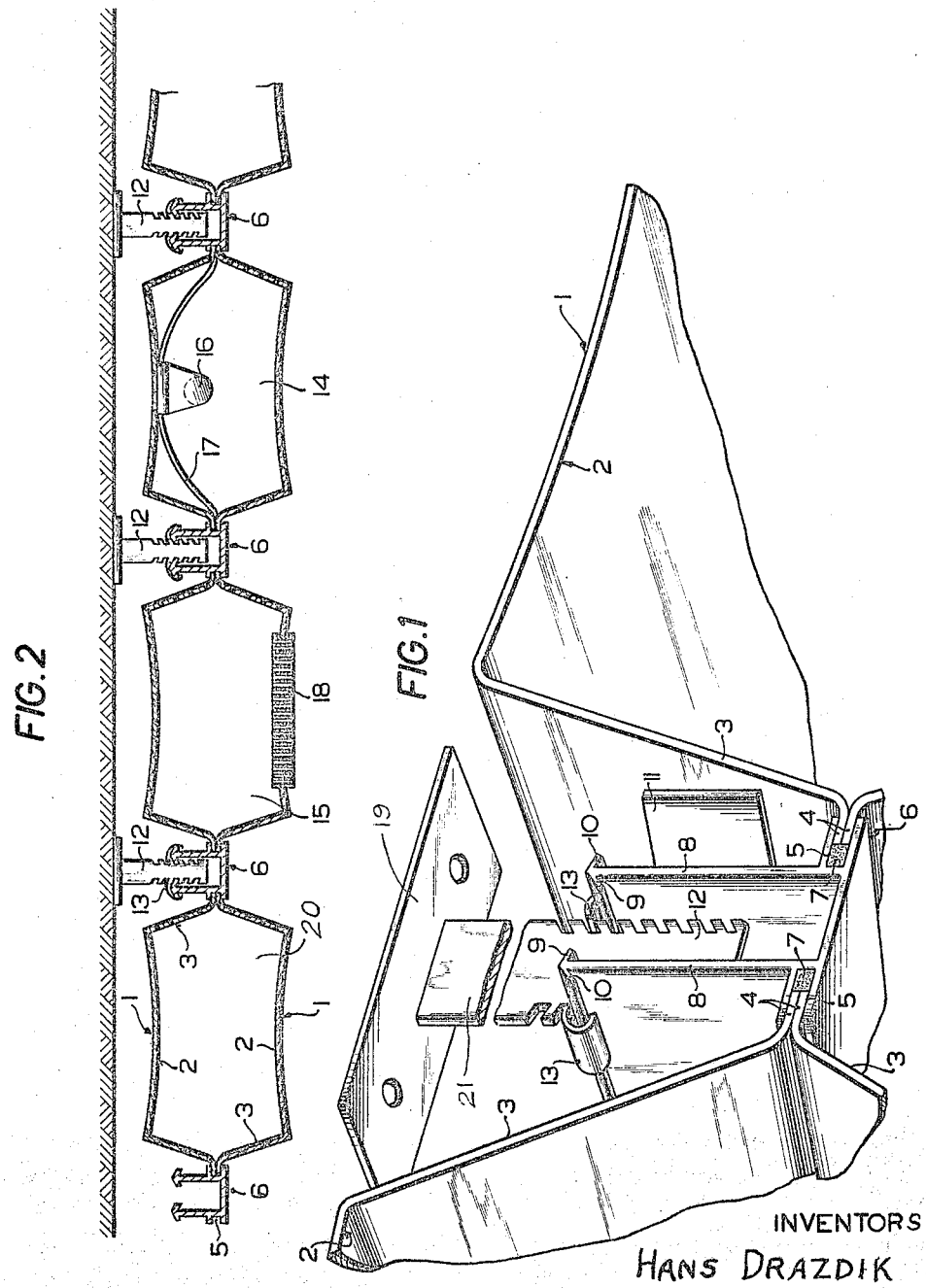
INVENTORS
HANS DRAZDIK
and ERNST JACOBI
by Bair, Freeman & Molinare
Atty's

United States Patent Office 3,264,792
Patented August 9, 1966

3,264,792
SUSPENSION CEILING
Hans Drazdik, Frankfurt am Main, and Ernst Jacobi, Kronberg-Schonberg, Taunus, Germany, assignors to Hans J. Zimmer Verfahrenstechnik, Frankfurt am Main, Germany
Filed Dec. 21, 1964, Ser. No. 419,702
3 Claims. (Cl. 52—508)

This invention relates to suspension ceilings and in particular to an improved suspension ceiling structure which is lightweight, easily installed and substantially maintenance free.

To provide aesthetic architectural effects and proper acoustics, large rooms such as theaters, industrial halls, exposition halls, community halls, railway stations and the like, are frequently equipped with suspension ceilings which suspend either from unfinished solid ceilings or roof structures. Conventionally, suspension ceilings are made of wood, metal, glass, plaster, compact materials, plastics or combinations of such materials.

Prior art suspension ceilings have proven unsatisfactory since they have an unduly high weight-per-surface-area ratio. This results in requiring heavy and expensive ceiling supporting structures. Further the elements of known suspension ceiling structures must be prepared and cut to size on location, and in a time-consuming assembling operation are installed using various kinds of relatively complicated fastening means. Maintenance is necessarily correspondingly expensive, especially when required on inaccessible carrier structures.

In addition, in prior art suspension ceilings with transparent surface elements which permit passage of light, such as are frequently employed in lobbys of buildings like banks and retail stores, accumulations of dust form on the insides of the transparent surfaces, which, because of the poor accessibility of surface elements, can be removed only with difficulty.

It is thus an object of this invention to provide a suspension ceiling which eliminates the aforementioned deficiencies of known structures.

In particular, it is the object of this invention to provide a suspension ceiling which is inexpensive, which is prefabricated and can be assembled on location with a minimum of tools and unskilled personnel, which is lightweight, i.e. has a small weight-to-surface-area ratio, and which is substantially maintenance free.

According to the invention the above objects are accomplished by providing a plurality of longitudinally extending trough-like elements, preferably of plastic, and girder or carrier strips suspended on a room ceiling or roof structure provided with lateral grooves into which the trough-like elements are engaged.

This suspension ceiling is easily assembled, and permits considerable prefabrication of the constructive elements, which can be assembled at the installation place in a short time without the use of specially trained personnel. For this purpose, after suspension of the carrier strips, neither tools nor additional fastening means are necessary, such as screws, nails, rivets or the like. because the trough-like elements, resilient in themselves are merely snapped in place.

The trough-like elements are employed in pairs with their open sides facing one another to form a plurality of box-like enclosures or hollow panel units, the ends of which have outwardly extending flanges in face-to-face contact and which fit into the lateral grooves of the carrier strips. Such construction offers the additional advantage that lamps, preferably elongated fluorescent bulbs, can be mounted within the trough-like elements adjacent to the room ceiling or roof construction. This makes unnecessary the provision of additional room lights and light fixtures. Preferably the lamps are attached to metal spring bows bowed in an upward direction and engaged with their ends in opposing grooves of adjacent carrier strips.

The box-like enclosures or hollow panel units also are adaptable for use as air passages by providing the lower section facing the room with air grids by means of which the room can be ventilated and provided with conditioned air by appropriate connection to blowers or air-conditioning installations. Thus installation of expensive wall and ceiling air shafts and their coverings is avoided. It is thus possible by this invention to provide a suspension ceiling with a combination of light bands and air ducts as well as elements which perform no lighting or vendilating function.

The above and other objects and features of the invention will be more readily apparent from the following description when read in connection with the accompanying drawing, in which:

FIG. 1 is a partial view in perspective of the structure of the invention;

FIG. 2 is an end view, partially in section, through the structure of the invention.

The structure of the invention consists generally of three elements: trough-like sections 1 which when assembled in opposed relation form box-like hollow panel units (FIG. 2); carrier strip holders indicated generally at 12 which are T-shaped, have a plurality of downwardly inclined notches and are attachable to a solid ceiling or ceiling studs by face plates 19; and carrier strips 6 which ride on carrier strip holders 12 and support sections 1. The elements are assembled as shown in FIG. 1 and as described in detail hereinafter.

Trough-like sections 1 made preferably of fiber glass-reinforced plastic, e.g. polyester as hereinafter more fully described, have a slightly curved base 2 and sloping side walls 3, the terminal portion of walls 3 having edges bent to form projections or flanges 4, generally parallel with base 2. Sections 1, can be manufactured in molds or by an endless flow process in a manner well known in the art. To assure easy handling of elements 1 in the installation, the ratio of width to length should, preferably, not exceed the value of 1:10.

Elements 1 with end projections or flanges 4 are engaged in grooves 5 of the carrier strips 6 with flanges 4 in face-to-face contact. For sealing the box-shaped passage formed in grooves 5 by the insertion of ends 4, packing strips 7 of any resilient material resistant to heat and age such as a suitable plastic or sponge rubber are inserted in grooves 5 prior to inserting ends 4.

It is thus seen that trough-like elements 1 are designed so that, as viewed from the open end (FIG. 2), they have convexly formed bottoms 2, side walls 3 and end projections 4 constructed so that elements 1 are strong and are highly resilient transversely providing for the snapping-in of ends 4 into grooves 5. It should be understood that elements 1 are arranged in end-to-end abutting relation (not shown in drawing) to form long channels and are fastened together as set out below. The number of elements 1 required will depend in the length of the room and the desired coverage of the suspended ceiling.

Packing strips 7, being under the influence of the lateral urging of projections 4, are pushed inwardly onto the surfaces adjacent them and seal groove 5 to provide a practically dustproof closure.

One fastening strip 8 of each carrier unit 6 is provided with a link plate 11 which may be bolted or otherwise suitably fastened to strip 8. Plate 11 protrudes longitudinally beyond the ends of strips 8 (FIG. 1) and provides the means to connect abutting strips 8 of adjoining carrier units. Abutting elements 1 are joined by sheet metal strips (not shown) of light metal which overlap a portion of two elements to be joined. The abutting sheet metal strips can be screwed onto elements 1 by self-cutting thread screws with an interlay of resilient packing material of heat and age resistant plastic or rubber to provide a seal.

Securing the suspension ceiling on the room ceiling or roof studs is simple and can be done quickly. Carrier strips 6 are placed on notched strips 12 previously fastened to the room ceiling or roof through face plate 19 by screws or other suitable fastening means. Because of the rigidity of carrier strips 6 and fastening strips 8, only a few notched strip suspensions are necessary per carrier strip length. In mounting carrier strip 6, flange projections 9 at the ends of fastening strips 8 engage easily the notches of strips 12. By proper selection of notch engagement, height adjustment of the carrier strips is effected. For securing flanges 9 in place, C-shaped spring clamps 13 are used. They grip flange projections 10 from underneath and secure them to the toothed strips as shown in FIG. 1. Spring clamps 13 are attached manually with no difficulty, and thus hold carrier strips 6 to carrier strip holders 21 which makes possible rapid installation of carrier strips without the aid of tools. Trough-like elements 1 are then engaged in grooves 5 of carrier strips 6.

The partial cross section shown in FIG. 2 of a suspension ceiling according to the invention contains, arranged next to each other, a light band 14, an air passage 15 and a passage 20 which serves neither illuminating nor ventilating function. In the light band 14 are mounted long-tube lights 16, e.g. fluorescent lamps which are attached to spring bows 17 as, for example, by screwing in place which, in turn, are inserted in the grooves 5 of opposed carrier strips. Thus the weight of the lamps is transferred to carrier strips 6 and carrier strip holders 21 without the trough-like elements 1 being in any way burdened.

Trough-like elements 1 adjacent to the room ceiling may consist of colorless plastic material, preferably polyester, and may be provided on their interior surface with a reflecting coating. The corresponding lower element whose surface faces the open room, is made of material, preferably polyester, which has a frosted glass character and allows passage of diffused light.

Trough-like elements 1 facing the room of the air duct 15 consist likewise of, preferably, polyester with the character of frosted glass and contain inserted in the face thereof air grids 18. Trough-like element 1 of air duct 15 facing the room ceiling may consist of colorless plastic material, preferably polyester resin reinforced with glass fibers or fabric. In passages serving no illuminating or ventilating function such as 20, trough-like elements 1 facing the room are preferably polyester with the character of frosted glass, while trough-like elements 1 adjacent to the ceiling can be made of colorless plastic material, preferably polyester. It is, of course, possible to provide all or any ones of the trough-like elements facing the room of a dyed material, preferably polyester, as desired.

The light bands of the suspension ceiling according to the invention are completely dust-tight, so that no troublesome accumulations of dirt can form. In the event that it is desirable to cool the light bands by blowing air therethrough, it is preferable to provide dust filters arranged in the ventilating feed lines or at the ends of the light bands.

The polyester from which the trough-like elements are preferably made may be any commercially available polyesters known in the art. Examples are materials sold under the trade-names Laminac and Vibrin. Detailed descriptions for preparing such polyester resins may be found in U.S. 2,255,313, British 540,167, 540,168, and 540,169 as well as in Vale's "The Chemistry of Unsaturated Polyester Resins," a paper published in British Plastics, September 1953, pages 327–332.

In some installations of the above described suspension ceiling, it may be desirable to provide insulation between the upper trough-like elements and the room ceiling or roof studs. This can be advantageously done by draping insulating matting (not shown) e.g. fiber glass matting or any other insulation matting known in the art, over the carrier strips prior to installation of trough-like elements 1. On engagement of the elements 1 on the carrier strips, the matting is pushed upward and lies atop the trough-like elements 1 as a continuous insulating blanket between the room ceiling or studs and the suspension ceiling.

While but several embodiments of the invention have been shown and described herein, it will be understood that they are illustrative only and not to be taken as a definition of the scope of the invention, reference being had for this purpose to the appended claims.

We claim:

1. A suspension ceiling structure comprising means attachable to a support ceiling including subtending means having a plurality of downwardly inclined notches, carrier strip means having upstanding walls with flanged ends selectively engaged in said notches, clamping means securing said flanged ends into engagement with said notches, said carrier strip means being further provided with horizontally extending lateral grooves, and means comprising a pair of opposed trough-like members having outwardly extending flanges in face-to-face contact in said grooves to provide a suspended hollow panel unit.

2. A suspension ceiling structure comprising means attachable to a support ceiling including a plurality of subtending means having downwardly inclined notches, carrier strip means having upstanding walls with flanged ends selectively engaged in said notches, clamping means securing said flanged ends into engagement with said notches, said carrier strip means being further provided with a pair of opposed horizontally extending lateral grooves, and means comprising a plurality of pairs of trough-like members, each pair having outwardly extending flanges in face-to-face contact inserted in said grooves to provide a plurality of suspended hollow panel units.

3. A suspension ceiling structure comprising a plurality of subtending brackets having downwardly inclined notches, a plurality of U-shaped members having upstanding walls with flanged ends selectively engaged in said notches, clamping means securing said flanged ends into engagement with said notches, each said U-shaped member having a pair of laterally extending opposed horizontal grooves, a plurality of pairs of trough-like members, each pair having outwardly extending flanges in face-to-face contact inserted in said grooves to provide a plurality of suspended hollow panel units.

References Cited by the Examiner

UNITED STATES PATENTS 2,943,367  7/1960  Wong _____ 52—488

FOREIGN PATENTS 202,340  7/1956  Australia.
1,253,918  1/1961  France.

RICHARD W. COOKE, Jr., *Primary Examiner.*